United States Patent
Obata

(10) Patent No.: US 7,116,270 B2
(45) Date of Patent: Oct. 3, 2006

(54) METHOD AND SYSTEM FOR MULTIPATH DETECTION

(75) Inventor: Kijuro Obata, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 130 days.

(21) Appl. No.: 11/029,268

(22) Filed: Jan. 5, 2005

(65) Prior Publication Data

US 2005/0195108 A1 Sep. 8, 2005

(30) Foreign Application Priority Data

Jan. 7, 2004 (JP) ............... 2004-001861

(51) Int. Cl.
G01S 1/00 (2006.01)
H04B 7/185 (2006.01)
H01Q 3/22 (2006.01)

(52) U.S. Cl. ............ 342/357.15; 342/357.02; 342/357.06; 342/368; 342/372

(58) Field of Classification Search ......... 342/357.02, 342/357.06, 357.15, 368, 372
See application file for complete search history.

(56) References Cited

U.S. PATENT DOCUMENTS

| 4,959,653 | A | | 9/1990 | Ganz et al. |
|---|---|---|---|---|
| 5,940,026 | A | * | 8/1999 | Popeck ............ 342/357.01 |
| 6,084,540 | A | | 7/2000 | Yu et al. |
| 6,166,690 | A | | 12/2000 | Lin et al. |
| 6,618,016 | B1 | | 9/2003 | Hannan et al. |
| 6,727,846 | B1 | | 4/2004 | Brown |
| 2005/0280577 | A1 | * | 12/2005 | Feller ............ 342/357.11 |
| 2006/0033659 | A1 | * | 2/2006 | Strickland ............ 342/372 |

OTHER PUBLICATIONS

Eureopean Search Report dated Apr. 8, 2005.

* cited by examiner

Primary Examiner—Thomas H. Tarcza
Assistant Examiner—Fred H Mull
(74) Attorney, Agent, or Firm—Brinks Hofer Gilson & Lione

(57) ABSTRACT

A navigation system including a GPS receiver; a variable directivity antenna capable of forming a null point in at least one direction; a null point setting unit for setting the null point of the variable directivity antenna in the direction of a GPS satellite that can perform positioning; and a multipath determination unit for determining whether a reception signal from the variable directivity antenna is in a multipath state in accordance with the reception signal.

20 Claims, 8 Drawing Sheets

METHOD AND SYSTEM FOR MULTIPATH DETECTION

BACKGROUND OF THE INVENTION

1. Field of the Invention

The present invention relates to multipath detection methods in global positioning system (GPS) receivers used for detecting the positions of movable bodies, such as vehicles.

2. Description of the Related Art

Receivers, such as GPS receivers, for receiving signals that are spectrum-spread by a direct spread system receive signals from a plurality of earth-orbiting GPS satellites to detect the positions of vehicles, vessels, and the like. GPS receivers using three or more GPS satellites are capable of detecting two-dimensional positions (latitude and longitude). GPS receivers using four or more GPS satellites are capable of detecting three-dimensional positions (longitude, latitude, and altitude).

In-vehicle navigation apparatuses use signals received from the GPS receiver to detect the present position of a vehicle, display a map around the present position of the vehicle on a display, and provide route guidance from the present position of the vehicle to a destination.

A GPS receiver in an in-vehicle navigation apparatus includes an antenna 200 that has a directivity in the zenith direction and that is mounted on a vehicle, for example, as shown in FIG. 9. The GPS receiver receives radio waves from three or four GPS satellites 210 via the antenna 200, performs de-spreading and demodulation on the received signals, and regenerates original transmission signals.

Also, for example, Japanese Unexamined Patent Application Publication No. 5-302972 discloses a positioning apparatus in which antennas A and B having narrow grazing angles of θ1 and θ2, respectively, are installed in a vehicle so that diversity reception is performed using the antennas A and B, as shown in FIG. 10. The positioning apparatus switches time-divisionally between the antennas A and B using a switching circuit, so that information from the GPS satellites 210 received by any one of the antennas A and B is used for positioning calculation. Accordingly, time for position detection can be reduced.

However, the known in-vehicle navigation apparatuses described above have problems. For example, when a vehicle provided with such a navigation apparatus travels on a road surrounded by high-rise buildings or the like in an urban area, a GPS receiver may receive multipath indirect waves due to reflection by the buildings. The GPS receiver may not detect the present position of the vehicle accurately under the influence of multipath because an error may occur in position calculation if waves other than pure direct waves from GPS satellites are used for position detection.

In order to solve such a problem, a beam antenna having a directivity of a particular direction may be used to reduce the influence of multipath. It is, however, practically difficult to use an antenna having a directivity of a particular direction for the GPS receiver because the GPS receiver needs to receive radio waves from a plurality of satellites. In contrast, the GPS receiver may be provided with a multipath detection circuit so that multipath noise can be eliminated from reception signals. This arrangement, however, complicates a circuit configuration of the GPS receiver and increases the cost of the GPS receiver.

SUMMARY OF THE INVENTION

In order to solve the above problems, an object of the present invention is to provide a receiver that is capable of detecting multipath of a reception signal with a high accuracy.

Another object is to provide a position detection method capable of detecting the position of a movable body with a high accuracy using the receiver. A further object is to provide a navigation system using the receiver.

According to an embodiment of the present invention, a receiver for receiving signals spectrum-spread by a direct spread system from satellites includes a variable directivity antenna capable of forming a null point in at least one direction; a null point setting unit for setting the null point of the variable directivity antenna in the direction of a satellite that can perform positioning; and a multipath determination unit for determining whether a reception signal from the variable directivity antenna is in a multipath state in accordance with the reception signal.

The multipath determination unit may determine that the reception signal from the variable directivity antenna is in the multipath state when the reception signal has a field intensity more than or equal to a predetermined value or when the amount of attenuation of the reception signal is less than a predetermined value.

According to another embodiment of the present invention, a navigation system installed in a movable body includes a receiver provided with the characteristics described above; a position detection unit for detecting a position of the movable body in accordance with an output signal from the receiver; a map storage unit for storing data including map data; a display; and a display control unit for reading map data corresponding to the position of the movable body detected by the position detection unit from the map storage unit and displaying the map data on the display.

According to another embodiment of the present invention, a multipath detection method in a receiver for receiving signals spectrum-spread by a direct spread system from satellites includes a first step of setting a null point of a variable directivity antenna in a direction of a satellite that can perform positioning; and a second step of determining whether or not a reception signal received from the variable directivity antenna is in a multipath state in accordance with the reception signal.

According to another embodiment of the present invention, a position detection method in a navigation system for a movable body includes a first act of setting a null point of a variable directivity antenna in a direction of a global positioning system satellite that can perform positioning; a second act of determining whether a reception signal received from the variable directivity antenna is in a multipath state in accordance with the reception signal; and a third act of detecting a position of the movable body in accordance with a plurality of reception signals that is determined not to be in the multipath state in the second act.

In an embodiment according to the present invention, a null point of a variable directivity antenna is set to a direction of a satellite that can perform positioning and a reception signal of the antenna is monitored, so that determination of whether the reception signal is in a multipath state can be performed. Thus, multipath detection can be performed efficiently without reducing the intensities of reception signals from satellites that are located in directions other than the direction of the null point. Also, by using the receiver for a navigation system, the position of a movable body is detected using reception signals from satellites that are not in the multipath state. Thus, an accuracy of position detection can be further improved.

It is therefore intended that the foregoing detailed description be regarded as illustrative rather than limiting, and that it be understood that it is the following claims, including all equivalents, that are intended to define the spirit and scope of this invention.

DESCRIPTION OF THE PREFERRED EMBODIMENTS

Preferred embodiments of the present invention will be described with reference to the drawings.

Figure 1:
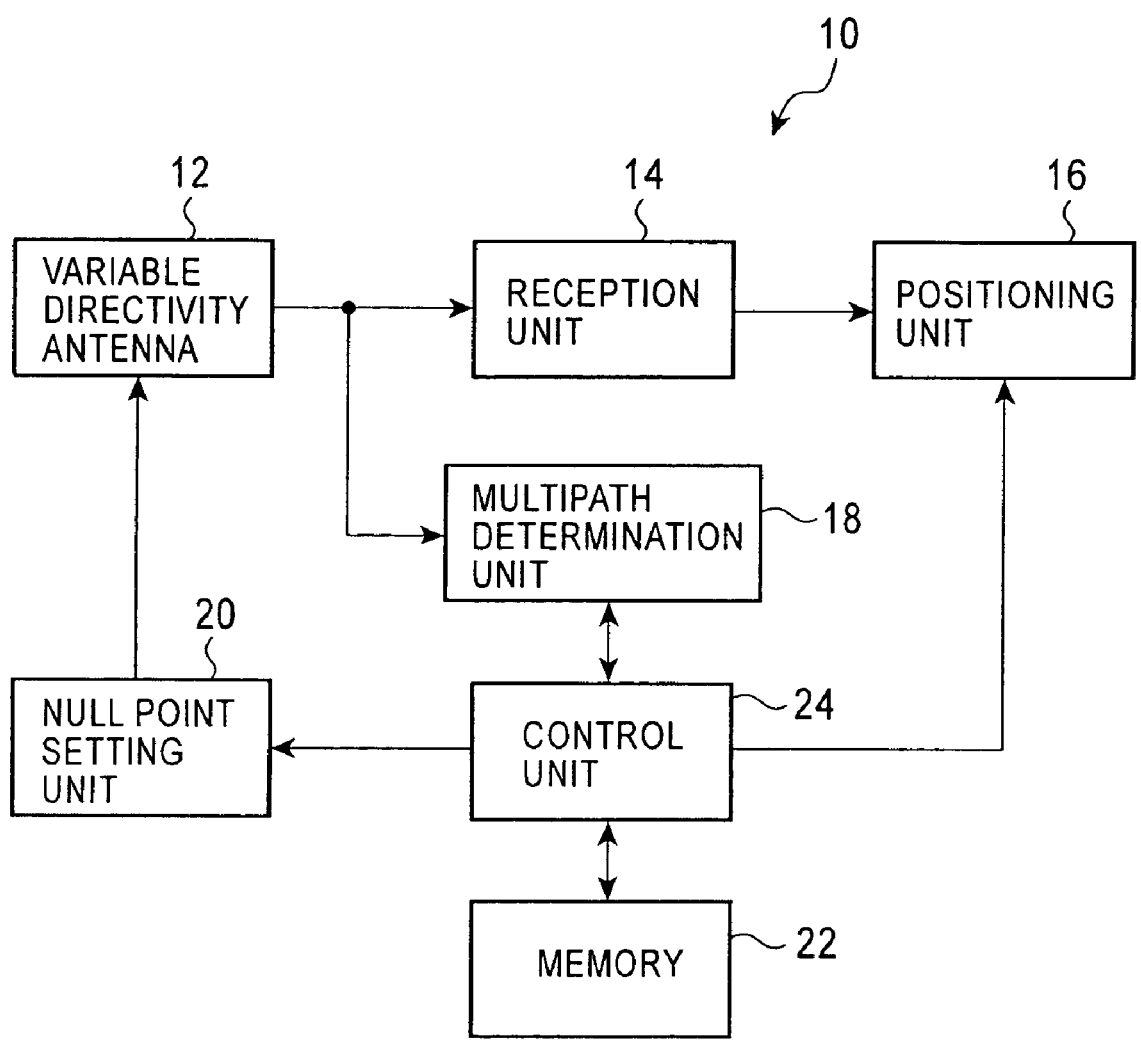
FIG. 1 is a block diagram showing the structure of a GPS receiver according to a first embodiment of the present invention.

FIG. 1 is a block diagram showing the structure of a GPS receiver according to a first embodiment of the present invention. A GPS receiver 10 includes a variable directivity antenna 12; a reception unit 14 for demodulating reception signals from the variable directivity antenna 12; a positioning unit 16 for measuring positions, such as distances to GPS satellites, using signals from the reception unit 14; a multipath determination unit 18 for receiving the reception signals from the variable directivity antenna 12 and determining whether or not the reception signals are in a multipath state; a null point setting unit 20 for setting a null point at a predetermined angle of a directional pattern of the variable directivity antenna 12; a memory 22 for storing positional information, such as almanac data, of GPS satellites; and a control unit 24 for controlling the operations of these units.

Figure 2:
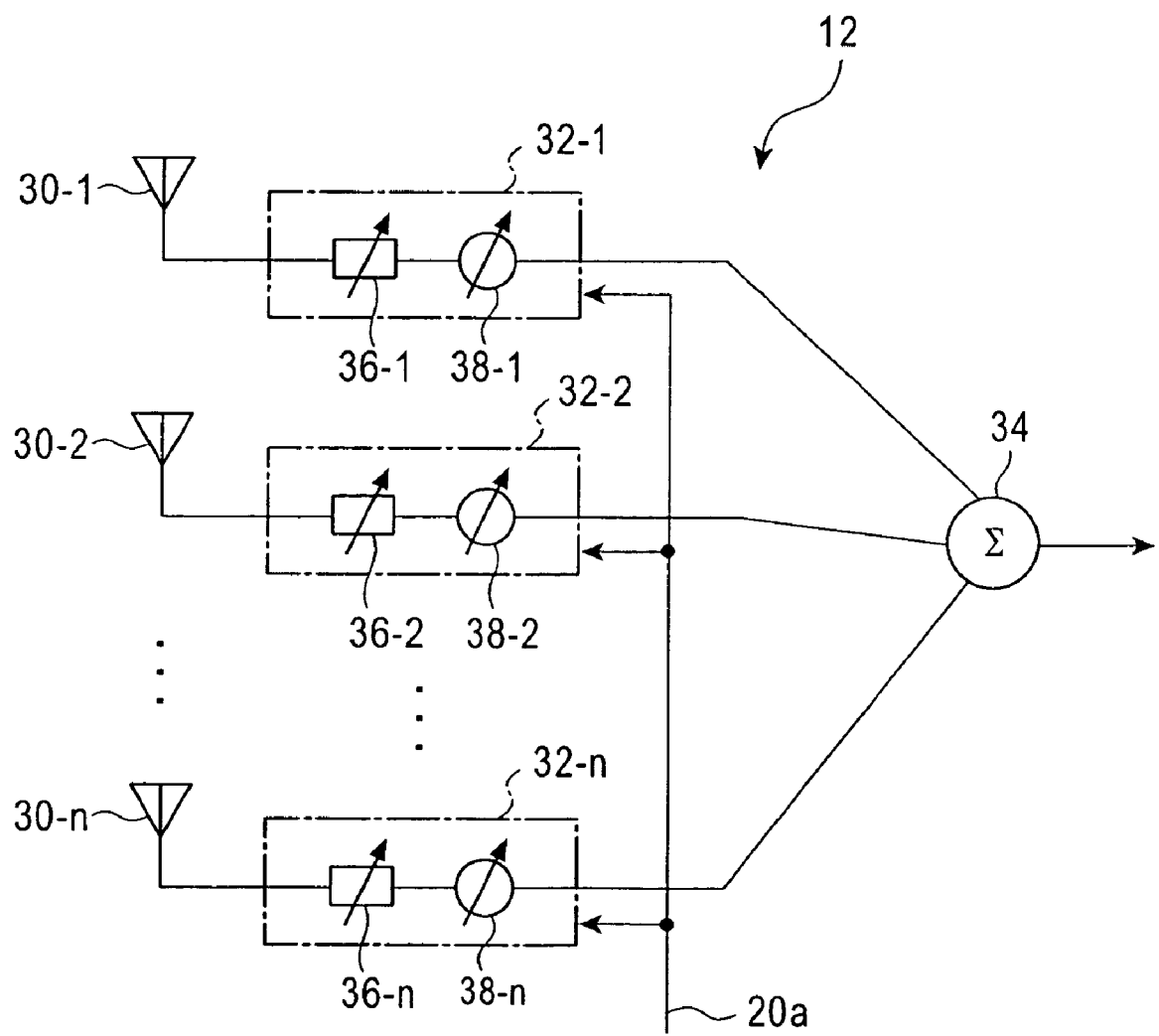
FIG. 2 illustrates the configuration of a variable directivity antenna.

The variable directivity antenna 12 is equal to a smart antenna or an adaptive antenna. FIG. 2 shows the structure of the variable directivity antenna 12. Referring to FIG. 2, the variable directivity antenna 12 includes a plurality of antenna elements 30-1, 30-2, •••, and 30-n, which are arranged in an array; weighting circuits 32-1, 32-2, •••, and 32-n for regulating the amplitudes and phases of excitation currents of the antenna elements 30-1, 30-2, •••, and 30-n, respectively; and an adder 34 for combining outputs from the n weighting circuits. The weighting circuits 32-1 to 32-n include amplitude regulators 36-1 to 36-n and phase regulators 38-1 to 38-n, respectively. The amplitude regulators 36-1 to 36-n and the phase regulators 38-1 to 38-n operate in accordance with an output signal 20a outputted from the null point setting unit 20. Regulating the amplitudes and phases by the weighting circuits 32-1 to 32-n forms a directional pattern having a directivity of a desired direction. In other words, the regulating sets a null point (nullification) in the desired direction.

The reception unit 14 RF-amplifies spread spectrum reception signals received at the variable directivity antenna 12 and performs baseband-demodulation by removing carriers from the reception signals. Also, the reception unit 14 de-spreads the demodulated baseband signals to regenerate original transmission signals.

The positioning unit 16 measures positions, such as distances to GPS satellites using the signals demodulated by the reception unit 14. The multipath determination unit 18 determines whether the reception signals are in a multipath state by checking the field intensities or the amounts of attenuation of the reception signals from the variable directivity antenna 12.

The null point setting unit 20 sets a null point in a directional pattern of the variable directivity antenna 12 in accordance with an instruction from the control unit 24. The direction of the null point is set to correspond to a direction of a GPS satellite that performs positioning, that is, a direction of incoming radio waves from the GPS satellite.

The memory 22 stores positional information on GPS satellites. The positional information may be, for example, almanac data representing orbital information on GPS satellites or ephemeris data including accurate orbital information on GPS satellites. The almanac data or the ephemeris data may be received from GPS satellites. Alternatively, the almanac data or the ephemeris data may be obtained from base stations or other data sources. The positional information on a GPS satellite is referred to when a null point of the variable directivity antenna 12 is set and the GPS satellite is searched for.

Figure 3:
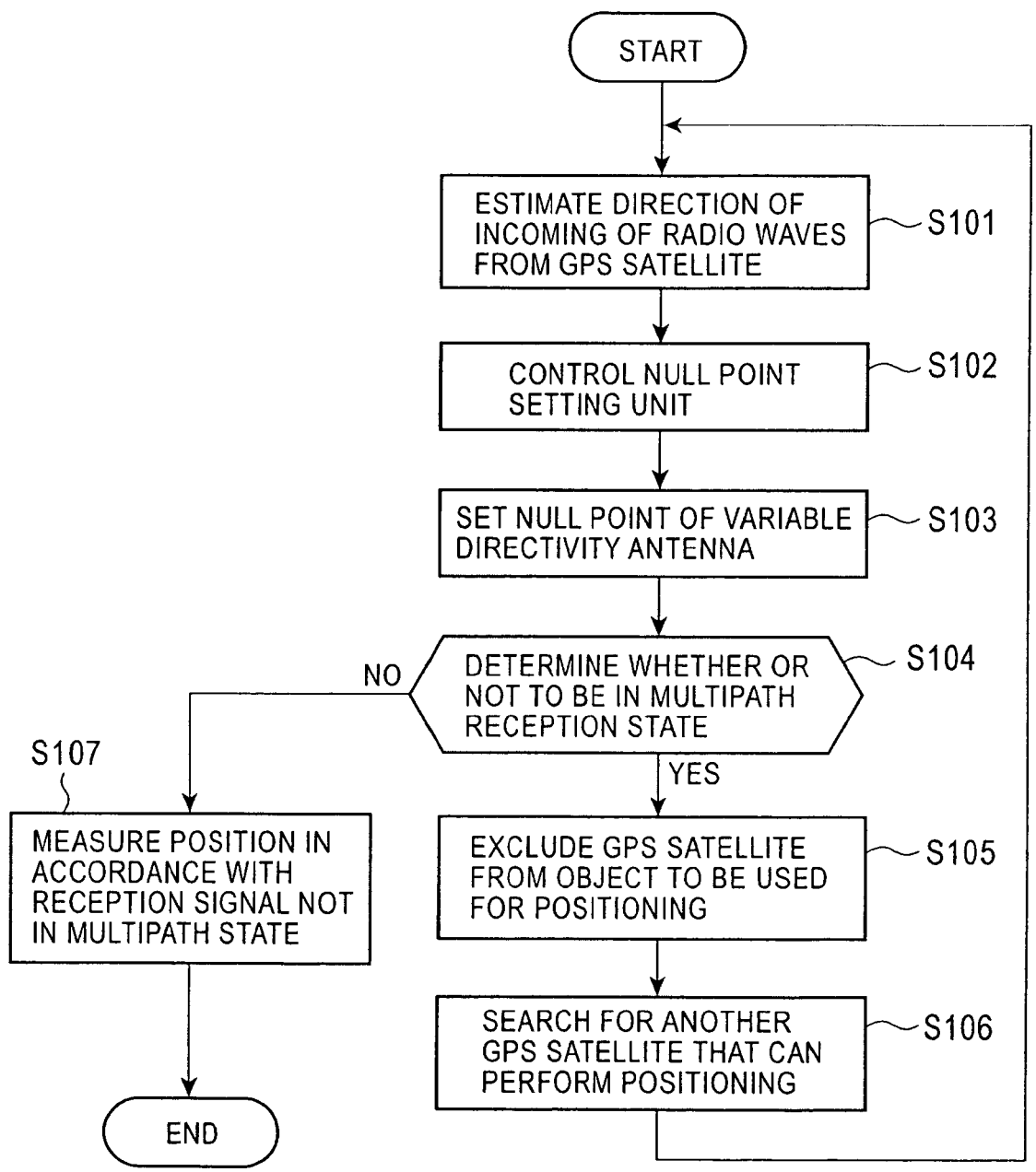
FIG. 3 is a flowchart of a process for multipath detection in the GPS receiver.

The control unit 24 includes, for example, a central processing unit or a microcomputer. The control unit 24 in the first embodiment controls an operation of each unit of the GPS receiver and controls multipath detection performed in the GPS receiver. A process for the multipath detection is described next with reference to a flowchart shown in FIG. 3.

The control unit 24 estimates a direction of incoming radio waves from a GPS satellite in accordance with positional information on the GPS satellite stored in the memory 22 (act S101). Then, the control unit 24 controls the null point setting unit 20 so as to form a null point in a direction corresponding to the direction of the incoming radio waves (direction of the GPS satellite) (act S102). The null point setting unit 20 controls the amplitudes and phases by the weighting circuits 32-1 to 32-n of the variable directivity antenna 12 using the output signal 20a, and sets a null point (act S103).

Figure 4:
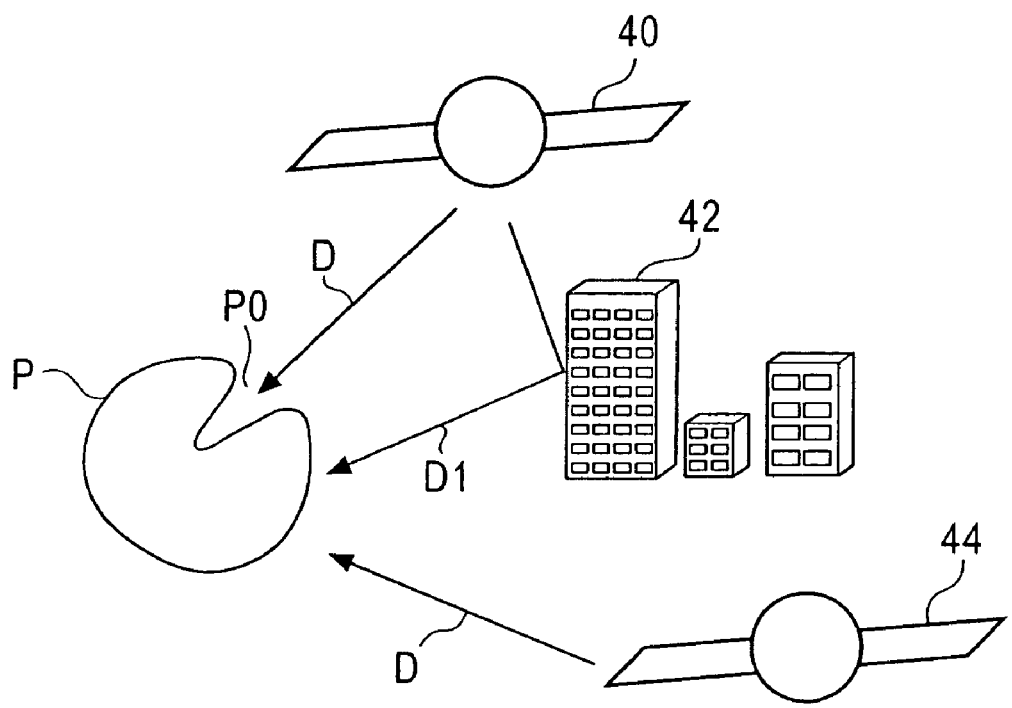
FIG. 4 illustrates the principle of multipath detection.

The multipath determination unit 18 receives an output from the adder 34 of the variable directivity antenna 12 and determines whether the reception signal is in a multipath state (act S104). FIG. 4 illustrates the principle of multipath detection. As shown in FIG. 4, a null point P0 in which the gain is nullified is formed in a directional pattern P of a variable directivity antenna. The null point P0 is set, for example, in a range of approximately 10 degrees, and an approximately equal gain is provided at other angles. Coefficients for regulating the amplitudes and phases are calculated in advance. Also, as described above, the direction of the null point P0 corresponds to the direction of a GPS satellite 40 that can perform positioning.

When the intensity of a reception signal of the variable directivity antenna 12 is less than a predetermined threshold, the multipath determination unit 18 determines that the reception signal is not in a multipath state. This is because that, since radio waves from the GPS satellite 40 have a strong property of rectilinear propagation, if direct waves D are received by the variable directivity antenna 12, the intensity of the reception signal should be zero or approximately zero due to the null point P0.

In contrast, if the intensity of a reception signal is more than or equal to the predetermined threshold, the reception signal is determined to be in the multipath state. In other words, a fact that the reception signal has a predetermined intensity although the intensity of the reception signal should be zero or approximately zero indicates that radio waves are received from a direction other than the direction of the null point. In other words, it is presumed that radio waves from the GPS satellite 40 are reflected by an obstacle 42, such as a high-rise building, and that indirect waves D1 are received.

When determining that the reception signal is in the multipath state in act S104, the multipath determination unit 18 outputs the determination result to the control unit 24. The control unit 24 excludes the GPS satellite determined to be in the multipath state from an object to be used for positioning (act S105). The control unit 24 searches for another GPS satellite that can perform positioning from positional information on the GPS satellites stored in the memory 22 (act S106). Then, the processing in acts S101 to S104 is repeated for the found GPS satellite, and it is determined whether a reception signal is in the multipath state.

If the multipath determination unit 18 determines that the reception signal is not in the multipath state in act S104, the control unit 24 gives a signal indicating permission for positioning to the positioning unit 16. The positioning unit 16 measures a position, such as a distance to the GPS satellite 40, in accordance with the reception signal not in the multipath state (act S107). Also, as shown in FIG. 4, radio waves from a GPS satellite 44, which is located in a direction other than the direction of the null point P0, can be received by the variable directivity antenna 12 without being attenuated. Thus, the present position can be detected using a triangle intersection method or the like by positioning by a plurality of GPS satellites using a variable directivity antenna.

As described above, according to the first embodiment, a null point of a variable directivity antenna is set to a direction of a GPS satellite that can perform positioning and the intensity of a reception signal from the antenna is monitored. Thus, detection of whether the reception signal is in a multipath state can be readily performed.

Although, the multipath determination unit 18 compares the intensity of a reception signal with a predetermined threshold in the first embodiment, this is merely an example and other procedures can also be used. For example, the intensity of a signal received at a point other than a null point is measured in advance, and the amount of attenuation, a difference, or the like from the signal intensity is calculated. If the calculated value is more than a predetermined value, it may be determined not to be in the multipath reception state. If the calculated value is less than or equal to the predetermined value, it may be determined to be in the multipath reception state.

Although, a variable directivity antenna is used as a preferable antenna in the first embodiment, the present invention is not necessarily limited to this. An antenna that can be used in the present invention is at least required to form a null point. For example, a dipole antenna for which a null point is formed in advance may be used. In this case, if the dipole antenna can rotate in a three-dimensional direction and the dipole antenna rotates at a desired angle, a null point can be set to a direction of a GPS satellite. Accordingly, the dipole antenna has a function similar to a variable directivity antenna.

Use of a variable directivity antenna increases the number of antenna elements. In accordance with the increase in the number of antenna elements, the entire power consumption is increased. Furthermore, if a GPS receiver is installed in a movable body, such as a vehicle, wiring for antenna elements is complicated. Thus, a solar battery may be provided in an antenna portion, so that power consumption of a battery or the like for supplying power to the antenna can be reduced. Also, wireless antenna module may be arranged.

In addition, although a null point is formed in the first embodiment, two null points may be formed so that reception signals from two GPS satellites are determined at the same time whether to be in a multipath state by setting the two null points to the directions of the two GPS satellites. In addition, two or more null points may be formed so that multipath can be detected using any one of the null points.

Figure 5:
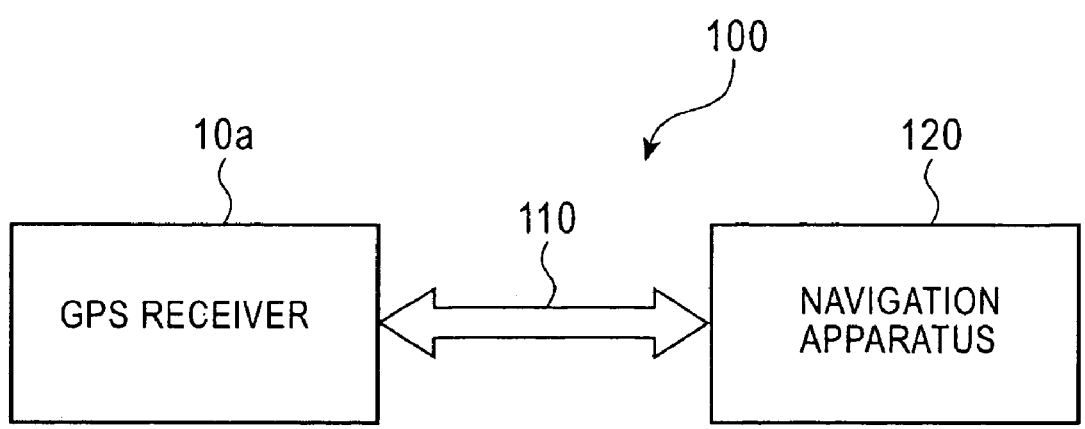
FIG. 5 shows the structure of a navigation system according to a second embodiment of the present invention.

A second embodiment of the present invention is described next. A navigation system according to the second embodiment is an application of the GPS receiver according to the first embodiment to a navigation system. As shown in FIG. 5, a navigation system 100 includes a GPS receiver 10*a* and a navigation apparatus 120 connected to the GPS receiver 10*a* via a connection line 110, such as a bus. Preferably, the navigation system 100 is installed in a movable body, such as a vehicle or a vessel.

Figure 6:
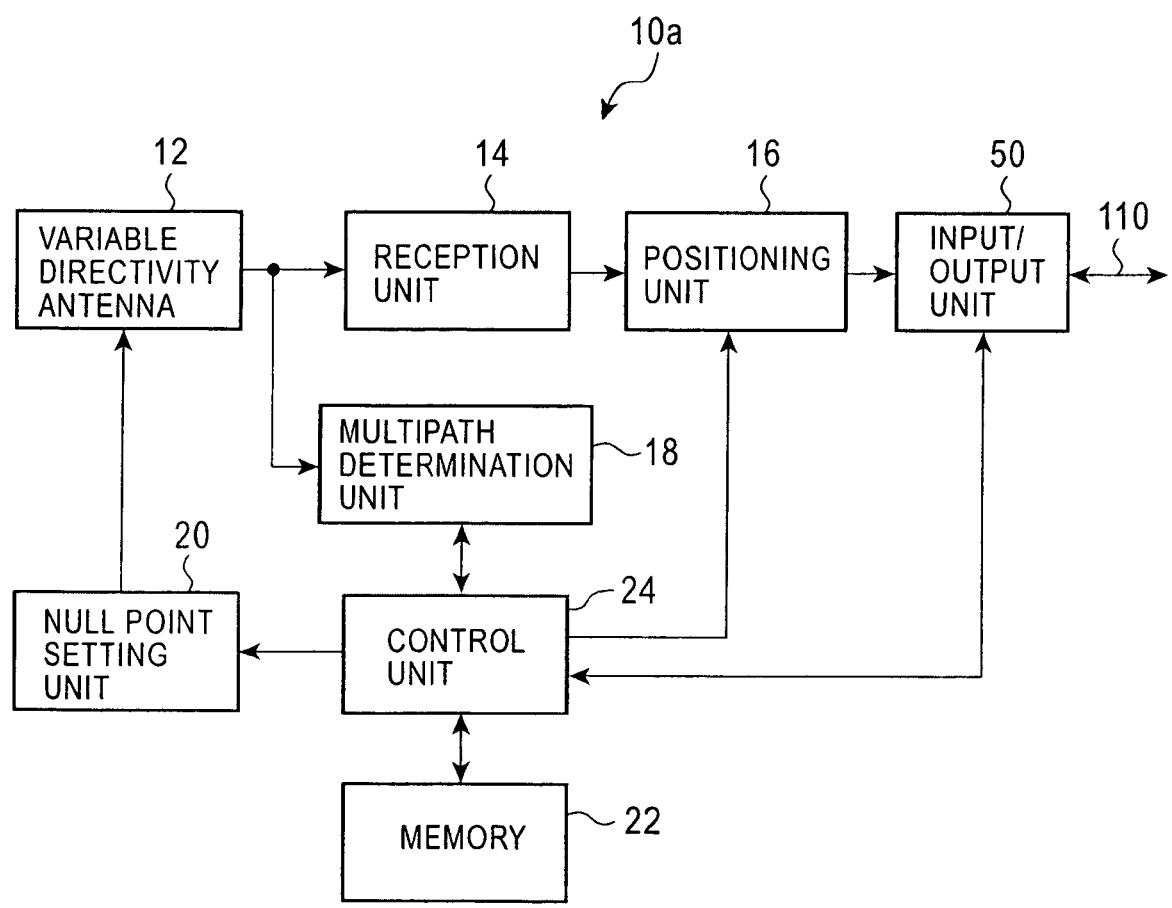
FIG. 6 is a block diagram showing the structure of a GPS receiver used in the second embodiment.

In addition to the structure shown in FIG. 1, the GPS receiver 10*a* further includes an input/output unit 50 for transferring signals with an external apparatus, as shown in FIG. 6. The input/output unit 50 functions as an interface for outputting signals for positioning by the positioning unit 16 to the connection line 110 and transferring control signals and the like between the control unit 24 and the navigation apparatus 120.

In contrast, as one of skill in the art would appreciate, the navigation apparatus 120 has a function to detect the present position of a vehicle in accordance with information obtained by positioning performed by the GPS receiver 10*a*, to provide map guidance around the present position of the vehicle, to search for the most suitable route from the present position of the vehicle to a destination, and to provide route guidance.

Figure 7:
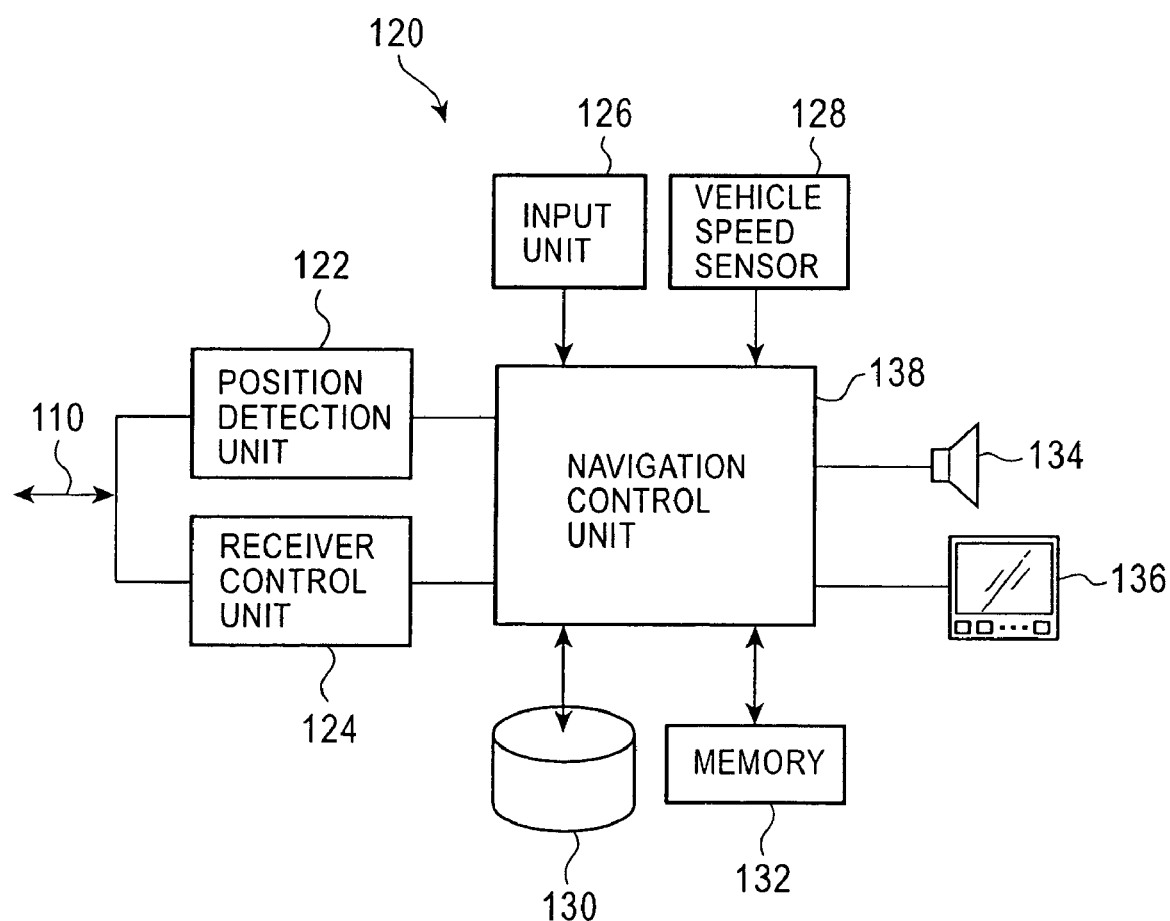
FIG. 7 is a block diagram showing the structure of a navigation apparatus.

FIG. 7 is a block diagram showing the structure of the navigation apparatus 120. The navigation apparatus 120 includes a position detection unit 122 for receiving an output signal from the GPS receiver 10*a* via the connection line 110; a receiver control unit 124 for transferring a control signal and the like with the GPS receiver 10*a* via the connection line 110; an input unit 126 for inputting a user instruction and the like; a vehicle speed sensor 128 for outputting vehicle speed information; a map database 130 for storing a map and the like necessary for navigation; a memory 132 for storing various data; a speaker 134 for outputting sound guidance and the like; a display 136; and a navigation control unit 138 for controlling the operations of these units.

The position detection unit 122 receives positioning signals for a plurality of GPS satellites used for positioning by the GPS receiver 10*a* and detects the position of the vehicle preferably using a triangle intersection method. The receiver control unit 124 sends a control signal via the connection line 110 to control the operation of the GPS receiver 10a, and transmits signals and the like from the GPS receiver 10a*l to the navigation control unit* 138.

The operation for position detection in the navigation system 100 according to the second embodiment will now be explained. The multipath determination unit 18 of the GPS receiver 10a performs multipath detection for a reception signal, and outputs the detection result to the control unit 24. The control unit 24 causes the input/output unit 50 to output an identification signal of the GPS satellite and a reception condition signal indicating the reception condition in accordance with the detection result. These signals are supplied to the navigation control unit 138 via the receiver control unit 124. The reception condition signal includes information on whether the GPS satellite is in the multipath state, whether a signal of the GPS satellite is being received, whether a signal of the GPS satellite cannot be received, and the like.

If the reception signal is not in the multipath state, a signal from the positioning unit 16 is sent to the position detection unit 122, so that the position detection unit 122 detects the position of the vehicle. Since a multipath signal is not used for the position detection, the position of the vehicle can be detected accurately. The navigation control unit 138 receives information on the present position of the vehicle from the position detection unit 122, reads corresponding map data from the map database 130, and displays the map data on the display 136.

Figure 8:
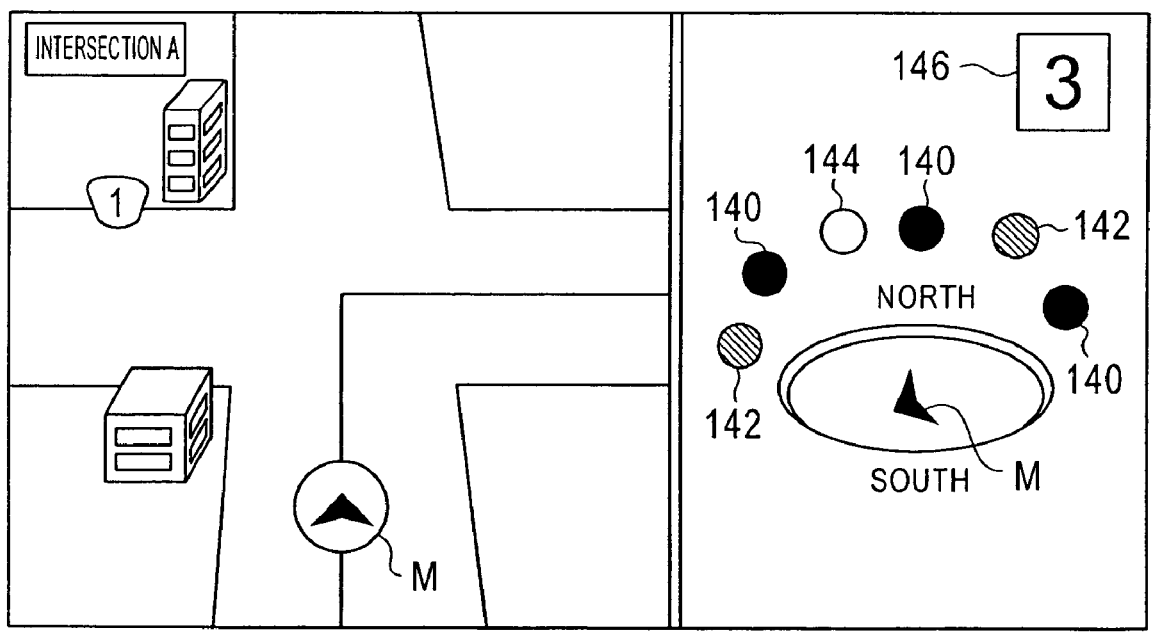
FIG. 8 illustrates an example of displaying reception conditions of GPS satellites.
Figure 9:
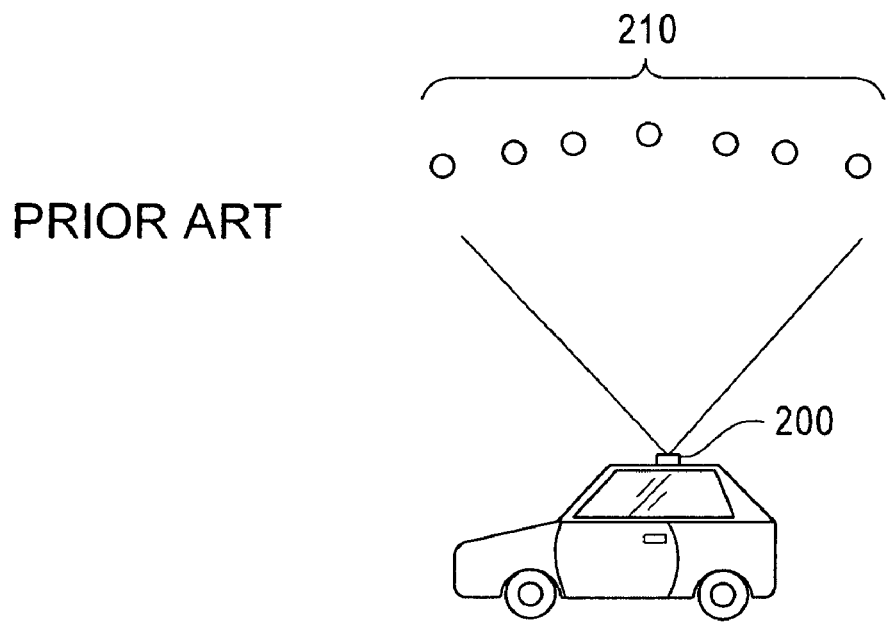
FIG. 9 illustrates an example of an antenna of a known GPS receiver.
Figure 10:
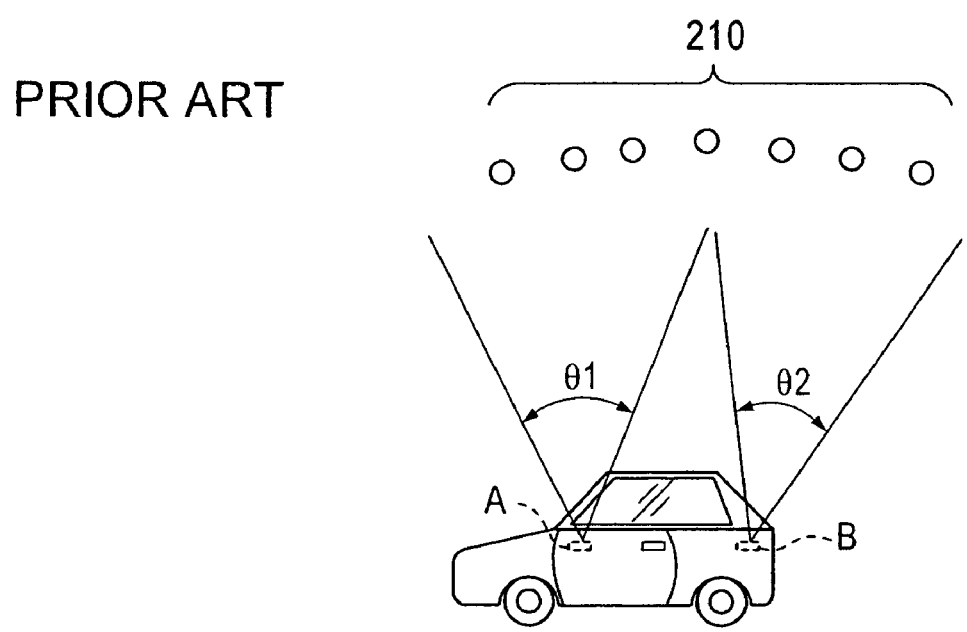
FIG. 10 illustrates an example of antennas of a known GPS receiver.

Furthermore, the display 136 displays reception conditions of GPS satellites, as shown in FIG. 8. In other words, on the left screen, a mark M representing the present position of the vehicle is superimposed on a map around the present position of the vehicle. On the right screen, the reception conditions of the GPS satellites are displayed. GPS satellites 140 (they are blacked out in FIG. 8) that are in the process of positioning, GPS satellites 142 (they are hatched in FIG. 8) that are excluded from objects to be used for positioning due to multipath, and a GPS satellite 144 whose signal cannot be received are displayed so as to be distinguishable from each other. In the top right corner, the number of GPS satellites whose signals are being received is displayed in a display area 146. In FIG. 8, "3" is displayed in the display area 146. The reception conditions of the GPS satellites are displayed under the control of the navigation control unit 138 in accordance with the identification data and the reception condition signals of the GPS satellites sent from the GPS receiver 10a, as described above.

An example in which the navigation apparatus 120 controls the GPS receiver 10a is described next. The GPS receiver 10a is capable of always checking whether a reception signal from a GPS satellite is in a multipath state even if an instruction is not sent from the navigation apparatus 120. However, the GPS receiver 10a is capable of performing multipath detection at desired time in accordance with an instruction from the navigation apparatus 120.

For example, by defining an area that is susceptible to multipath in advance, multipath detection may be performed when a vehicle enters the area. An address of an urban area including many high-rise buildings may be registered in the memory 132 as an area that is susceptible to multipath. When determining that the vehicle enters the area stored in the memory 132 in accordance with information on the present position of the vehicle from the position detection unit 122, the navigation control unit 138 outputs a control signal indicating to start the multipath detection from the receiver control unit 124 to the GPS receiver 10a. In response to the control signal, the GPS receiver 10a starts determination of whether a reception signal of a GPS satellite to be used for positioning is in the multipath state. In this case, until an instruction to start multipath detection is received, a null point is not set for the variable directivity antenna 12, and radio waves from all the GPS satellites can be received.

Also, the navigation control unit 138 may change timing of multipath detection performed by the GPS receiver 10a in accordance with a vehicle speed obtained from the vehicle speed sensor 128. Since the present position of a vehicle does not change much when the vehicle travels at a low speed, multipath detection for a GPS satellite may be performed at a longer interval. On the contrary, since the present position of the vehicle changes much more when the vehicle travels at a higher speed, multipath detection should be performed more frequently. For example, when the vehicle speed is less than a predetermined value, the GPS receiver 10a may perform multipath detection at a default time interval. When the vehicle speed is more than or equal to the predetermined value, the receiver control unit 124 may send a control signal to the GPS receiver 10a so that multipath detection is performed at a shorter time interval.

Also, when the GPS receiver 10a detects multipath, the navigation control unit 138 may store the position of the vehicle at that time in the memory 132. Positional information on a position where multipath has occurred can be registered as a position that is susceptible to multipath, as described above.

Although the preferred embodiments of the present invention have been described, the present invention is not limited to a particular embodiment. Various modifications and changes may be made to the present invention without departing from the sprit and scope of the present invention as defined by the claims.

Obviously, the GPS receiver according to the present invention can be used for navigation apparatuses installed in vehicles, vessels, or the like. In addition, the GPS receiver according to the present invention may be installed in portable terminal devices or the like. For example, the GPS receiver according to the present invention may be used, together with a navigation function of notebook personal computers, portable telephone sets, or portable terminal devices.

What is claimed is:

1. A receiver for receiving spread-spectrum signals by a direct spread system from satellites, comprising:
   a variable directivity antenna operable to form a null point in at least one direction;
   a null point setting unit operable to set the null point of the variable directivity antenna in the direction of a satellite that can perform positioning; and
   a multipath determination unit operable to determine whether a reception signal from the variable directivity antenna is in a multipath state in accordance with the reception signal.

2. The receiver of claim 1, wherein the multipath determination unit determines that the reception signal from the variable directivity antenna is in the multipath state when the reception signal has a field intensity more than or equal to a predetermined value.

3. The receiver of claim 1, wherein the multipath determination unit determines that the reception signal from the variable directivity antenna is in the multipath state when the amount of attenuation of the reception signal is less than a predetermined value.

4. The receiver of claim 1, further comprising a storage unit for storing positional information on the satellites, wherein
the null point setting unit sets the null point in accordance with positional information on the satellite stored in the storage unit.

5. The receiver of claim 4, further comprising a control unit that excludes the satellite from an object to be used for positioning, searches for another satellite that can perform positioning in accordance with positional information on the other satellite stored in the storage unit, and controls the null point setting unit so as to set a null point in a direction of the other satellite when the multipath determination unit determines that the reception signal is in the multipath state.

6. The receiver of claim 1, wherein a distance to the satellite is measured in accordance with the reception signal when the multipath determination unit determines that the reception signal is not in the multipath state.

7. A navigation system, comprising:
a receiver including a variable directivity antenna operable to form a null point in at least one direction; a null point setting unit operable to set the null point of the variable directivity antenna in the direction of a satellite; and a multipath determination unit operable to determine whether a reception signal from the variable directivity antenna is in a multipath state in accordance with the reception signal;
a position detection unit operable to detect a position of the movable body in accordance with an output signal from the receiver;
a map storage unit operable to store data including map data;
a display; and
a display control unit operable to read map data corresponding to the position of the movable body detected by the position detection unit from the map storage unit and display the map data on the display.

8. The navigation system of claim 7, further comprising a receiver control unit operable to control operation of the receiver, wherein the receiver determines whether the reception signal is in the multipath state in accordance with a control signal from the receiver control unit.

9. The navigation system of claim 8, wherein the receiver control unit is operable to change an interval of determination of whether the reception signal is in the multipath state performed by the receiver in accordance with a moving speed of the movable body.

10. The navigation system of claim 8, further comprising an expected multipath occurrence position storage unit operable to store in advance a position in which multipath is expected to occur, wherein when the position of the movable body corresponds to the position stored in the expected multipath occurrence position storage unit, the receiver control unit sends the control signal to cause the receiver to determine whether the reception signal is in the multipath state.

11. The navigation system of claim 7, wherein the display control unit has a mode in which reception conditions of a plurality of satellites are displayed on the display in which a satellite that is determined to be in the multipath state is displayed so that it is distinguishable from a satellite that is determined not to be in the multipath state.

12. The navigation system of claim 7, further comprising a multipath occurrence position storage unit operable to store a position of the movable body when the multipath determination unit determines that the reception signal is in the multipath state.

13. A multipath detection method in a receiver for receiving spectrum-spread signals by a direct spread system from satellites, comprising:
setting a null point of a variable directivity antenna in a direction of a satellite; and
determining whether a reception signal received from the variable directivity antenna is in a multipath state.

14. The multipath detection method of claim 13, wherein when the intensity of the reception signal is more than or equal to a predetermined value, the reception signal is determined to be in the multipath state.

15. The multipath detection method of claim 13, wherein a direction of incoming radio waves from the satellite is estimated in accordance with positional information on the satellite stored in advance in a memory, and the null point is set in the estimated direction.

16. The multipath detection method of claim 13, further comprising the acts of:
excluding the satellite from an object to be used for positioning when the reception signal is determined to be in the multipath state;
setting a null point of a variable directivity antenna in a direction of an additional satellite; and
determining whether an additional reception signal received from the additional satellite is in a multipath state.

17. A position detection method comprising the acts of:
setting a null point of a variable directivity antenna in a direction of a global positioning system satellite;
determining whether a reception signal received from the variable directivity antenna is in a multipath state in accordance with the reception signal; and
detecting a position of the movable body in accordance with a plurality of reception signals that is determined not to be in the multipath state.

18. The position detection method of claim 17, further comprising the act of displaying reception conditions of a plurality of global positioning system satellites on a display, wherein
a global positioning system satellite from which signals received are determined to be in the multipath state is displayed in a manner distinguishable from a global positioning system satellite from which signals received are determined not to be in the multipath state.

19. The position detection method of claim 17, wherein the act of detecting a position of the movable body is changed in accordance with a speed of the movable body.

20. The position detection method of claim 17, wherein a direction of incoming radio waves from the global positioning system satellite is estimated in accordance with almanac data and the null point is set in the estimated direction.

* * * * *